United States Patent [19]
Lomet

[11] Patent Number: 5,287,501
[45] Date of Patent: Feb. 15, 1994

[54] MULTILEVEL TRANSACTION RECOVERY IN A DATABASE SYSTEM WHICH LOSS PARENT TRANSACTION UNDO OPERATION UPON COMMIT OF CHILD TRANSACTION

[75] Inventor: David B. Lomet, Westford, Mass.

[73] Assignee: Digital Equipment Corporation, Maynard, Mass.

[21] Appl. No.: 728,661

[22] Filed: Jul. 11, 1991

[51] Int. Cl.$^5$ .............................................. G06F 15/40
[52] U.S. Cl. ................................... 395/600; 395/425; 364/282.1; 364/281.4; 364/974; 364/DIG. 1
[58] Field of Search .................. 364/DIG. 1, DIG. 2; 395/650, 600, 425,

[56] References Cited

U.S. PATENT DOCUMENTS

| | | | |
|---|---|---|---|
| 4,648,031 | 3/1987 | Jenner | 364/200 |
| 4,819,159 | 4/1989 | Shipley et al. | 364/200 |
| 4,868,744 | 9/1989 | Reinsch et al. | 364/280 |
| 4,945,474 | 7/1990 | Elliott et al. | 364/200 |
| 5,043,866 | 8/1991 | Myre et al. | 364/200 |
| 5,095,421 | 3/1992 | Freund | 395/650 |
| 5,155,678 | 10/1992 | Fukumoto et al. | 345/425 |

FOREIGN PATENT DOCUMENTS

0425415A2 2/1991 European Pat. Off. .

OTHER PUBLICATIONS

Shin, Dong C. and Moon, Song C., "An Efficient Log--Based Crash Recovery Scheme for Nested Transactions", *Microprocessing and Microprogramming,* vol. 31, Nos. 1-5, Apr. 1991, pp. 99-104.
Rothermel, K. and Mohan, C., "ARIES/NT: A Recovery Method Based on Write-Ahead Logging for Nested Transactions", *Proceedings of the Fifteenth International Conference on Very Large Data Bases,* Amsterdam, 1989.
Weikum, Gerhard; Hasse, Christof; Broessier, Peter; Muth, Peter, "Multi-Level Recovery", *Proc.* 9th *Symposium on Principles of Database Systems* (1990).
Pu, Calton and Noe, Jerre D., "Design and Implementation of Nested Transactions in Eden", *IEEE,* 1987.
Tripathi, Anand R. and Wang, Pong-Sheng, "An Object-Oriented Design Model for Reliable Distributed Systems", *Proc.* 3rd Symposium on Reliability in Distributed Software and Database Systems (Clearwater Beach, Oct. 17-19, 1983).

Primary Examiner—Thomas C. Lee
Assistant Examiner—Paul Lintz
Attorney, Agent, or Firm—Cesari and McKenna

[57] ABSTRACT

When a subtransaction (46) of a higher-level transaction (50) commits during the operation of a database (10), the database enters into its operation log a record (FIG. 6) that acts both as a commit record for the subtransaction (46) and as an update record for the higher-level transaction and includes a field (74) that identifies a higher-level "undo" transaction whereby the subtransaction can be undone without individually undoing its constituent operations. By logging operations in this manner, the database can handle multi-level recovery with very few restrictions on the timing of its updates and log entries.

37 Claims, 7 Drawing Sheets

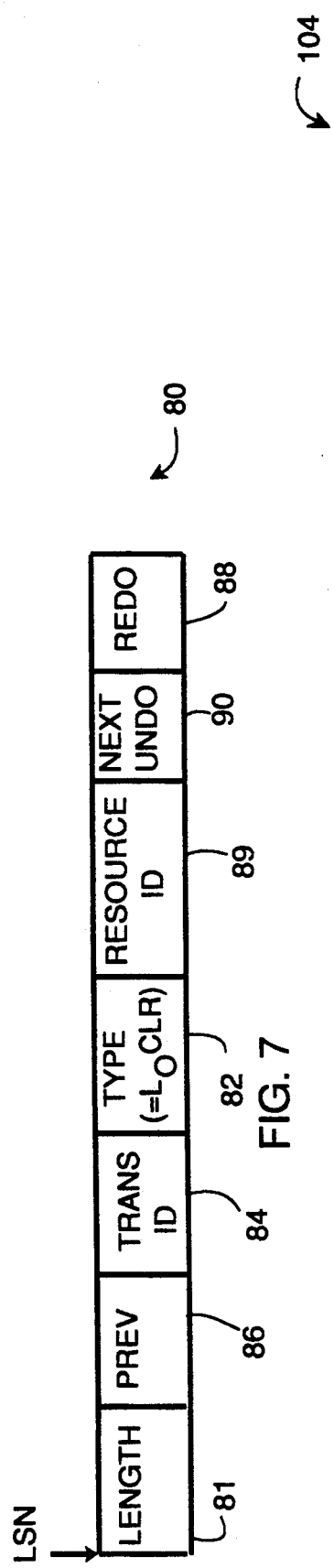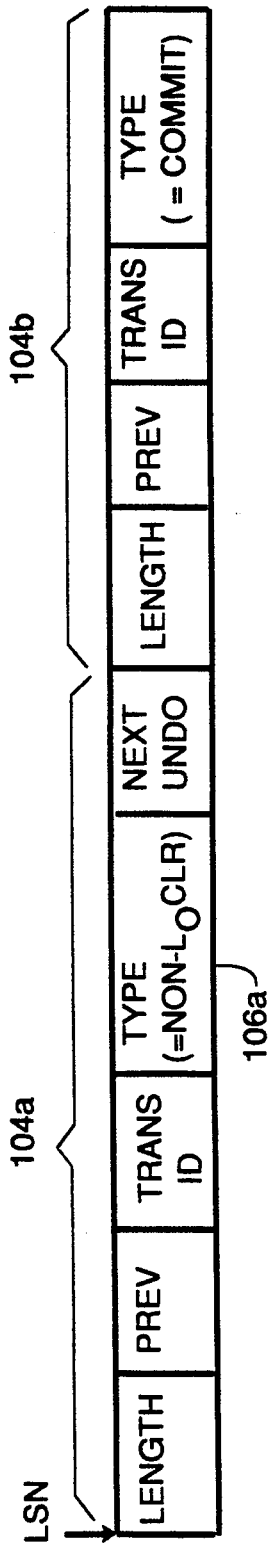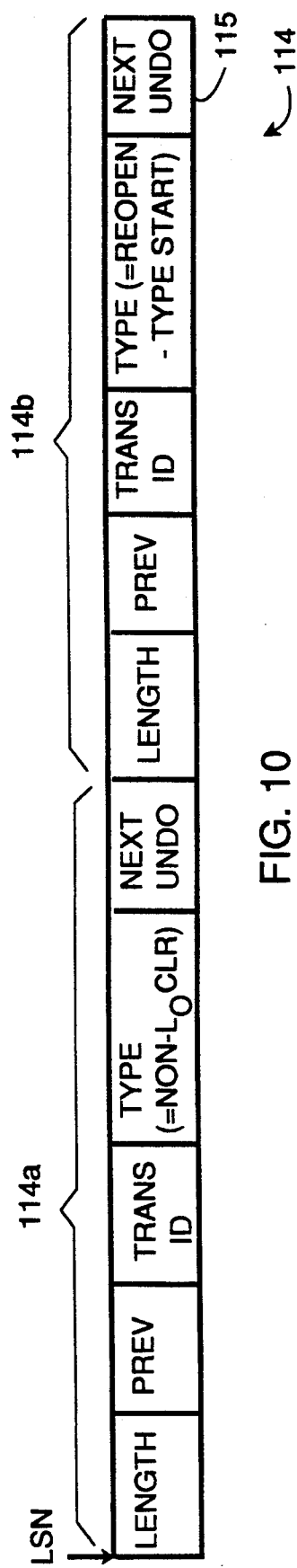
FIG. 7
FIG. 8
FIG. 10

MULTILEVEL TRANSACTION RECOVERY IN A DATABASE SYSTEM WHICH LOSS PARENT TRANSACTION UNDO OPERATION UPON COMMIT OF CHILD TRANSACTION

BACKGROUND OF THE INVENTION

The present invention concerns database systems and particularly recovery mechanisms for multilevel systems.

Sophisticated database systems provide multiple users access to common data. The actual computer time required for all of the individual operations in a transaction that a given user performs on a database is typically much less than the time between the user's requests for transactions. Moreover, a transaction may be so structured that delays occur between its individual operations. If parts of the database transactions of different users are interleaved, therefore, the wasted storage-system idle time can be reduced, as can the delay experienced by a user because of other users' transactions. The degree to which such interleaving can occur is often referred to as the system's concurrency.

Much of the lowest-level software, or kernel, of a database system is directed to scheduling operations so as to achieve some degree of concurrency. But the degree to which the system can maximize concurrency greatly depends on the higher-level database software, i.e., on the software that defines the types of transactions that the ultimate users will be able to request. Specifically, some concurrency loss results from the fact that the transaction-defining software ordinarily requires that its transactions be serializable, i.e., that the effect of a transaction whose constituent operations are interleaved with another transaction's operation be the same as that of the same transaction performed by itself in a non-interleaved fashion.

To achieve this serializability, the transaction designer specifies that resources accessed by given operations of the transaction be locked, i.e., be unavailable to other transactions' operations until some or all of the first transaction's operations have been completed. The kernel implements the locks by keeping track of locked resources. For the duration of the lock, therefore, other transactions are delayed to the extent that they require access to the locked resources.

Although the resultant loss in concurrency is undesirable, it is usually acceptable in databases that implement only relatively simple transactions, such as transferring money between bank accounts, in which individual locks are rarely held for very long. This is particularly true if no part of the database contents is used so intensively that demand for concurrent access to it is frequent. But the concurrency of a system that implements more-complicated transactions, such as those employed for computer-aided design, can suffer greatly.

For this reason, proposals such as that in Weikum et al., "Multi-Level Recovery," *Proc. 9th Symposium on Principles of Database Systems*, have been made to implement multi-level transactions in such a way as to employ less-restrictive locking. To understand the concept of multi-level transactions, it is beneficial first to review the relationship among operations, transactions, and levels or layers.

At the lowest level, an operation is typically the smallest action that can be taken on the hardware that embodies the non-volatile memory of the database system, so it is inherently serializable: the hardware is not capable of starting any other lowest-level operation before the first is finished. (Those familiar with pipelined accesses to disk controllers will recognize that there is a sense in which this is not entirely true, but it sufficient for present purposes that it appears to be true from the outside.) An example is the reading or writing of disk blocks in disk-drive controllers that provide access in blocks. If the drive writes any part of a block, it writes the whole block—i.e., writing a block is atomic—and it finishes writing the whole block before it begins access to any other block: writing a block is serializable.

A subroutine comprising a group of such operations is not inherently atomic or serializable, but it can be made so through the use of locks whose object resources are data blocks. A transaction is such a serializable subroutine. The concept of layers or levels enters the picture if a transaction itself comprises a plurality of transactions. In such a nested organization, not only is the transaction serializable with respect to other transactions, but its constituent "subtransactions" are serializable with respect to each other. The transactions can thus be seen to have a layered structure in which a transaction at one (lower) level comprising operations at that lower level can be thought of as an operation at the next-higher level, i.e., at the level of a transaction of which the lower-level transaction is a part. A plurality of lowest-level ("$L_0$") operations that constitute an $L_0$ transaction form an $L_1$ operation, which can in turn be part of an $L_1$ transaction that constitutes an $L_2$ operation.

Different levels typically deal with different levels of abstraction. At $L_0$, for instance, a transaction may be to subtract an amount from a record in a block explicitly specified by an argument of one transaction and add that amount to a corresponding record in another block similarly specified. The transaction designer—i.e., the implementor of the higher-level database software—should make such a transaction atomic if, for instance, it represents shifting money from one bank account to another, because the bank's books are "inconsistent" when they are in the state in which one part of the transaction has been performed without the other. Therefore, no transaction should be able to "see" the blocks involved until the $L_0$ transaction is complete.

A given higher-level transaction, on the other hand, might be the transfer an argument-specified amount from the account of argument-specified customer X to that of argument-specified customer Y. Such a transaction does not explicitly identify the disk blocks involved. Instead, it consists of a number of operations, typically organized into various levels of subtransactions, that access blocks containing, e.g., index information in the form of pointers to the blocks in which the information concerning X's and Y's accounts are currently stored and then access the blocks containing the account information. The account information thus must in some sense "stay put" if the transaction is to have the intended result. This, of course, is the purpose of locks. But a large number of data blocks can be accessed in a single transaction if the transaction is complex, as nested transactions tend to be, and many of the accessed blocks may need to be locked. The concurrency penalty that results from the proliferation of locks to which nested transaction structures lend themselves can thus be quite burdensome.

Specifically, recovery considerations normally dictate that a lock stay in force for the duration of the transaction in which it is acquired. If the locks are implemented at only a single level—i.e., if the lock table is simply a list of blocks, their associated lock types, and the transactions in which they were acquired—then a sufficiently complex transaction comprising multitudes of transactions nested to many levels can tie up a very large number of blocks for long periods of time.

This concurrency penalty can be reduced by implementing locks at higher levels of abstraction. Instead of requiring that a given block not be accessed, for instance, a high-level lock might require that X's account record not be accessed. Such locks tend to cause less of a concurrency penalty, because a high-level lock imposed ("acquired") by a high-level operation (i.e., by a lower-level transaction) replaces the lower-level locks acquired on the occurrences of the constituent operations of that lower-level transaction; the lower-level locks do not need to remain until the end of the highest-level transaction of which they are parts.

For example, although constituent parts of a high-level transaction may have instituted locks of a large number of blocks in performing their parts of the (higher-level) account accesses, those blocks are freed up at the ends of their respective lower-level subtransactions when they are replaced by the higher-level locks that those subtransactions institute. Therefore, a given high-level transaction prevents a concurrently operating transaction from accessing, say, only X's account record until the end of the given transaction; it is only for the (comparatively short) durations of various subtransactions that a concurrent transaction is prevented from accessing the various blocks that information concerning the account occupies during those subtransactions. Conceivably, therefore, concurrent transactions can proceed during the given transaction, even if to do so results in moving X's account information between blocks on different storage devices, so long as those concurrent transactions do not change the substance of that account information. This is not in general possible if only single-level locks are employed.

Adoption of such truly multi-level systems does require some effort; the transaction designer must not only design the higher-level locks but also high-level "undo" transactions for all of the high-level transactions. But such effort can eliminate the greater effort that might otherwise have to be invested in various ad hoc approaches to increasing concurrency. The additional design effort required for undo-operation and lock design therefore has not been the main deterrent to adoption of multi-level operation. The main deterrent has heretofore been the difficulty of obtaining a database kernel that provides a general method of recovery for such systems.

Database systems require some mechanism for recovering from transaction aborts caused by user intervention or processor "crashes." The database kernel typically provides the basic part of the recovery mechanism by maintaining in the system's non-volatile memory enough information about past operations to enable the completed operations of the interrupted transactions to be "undone" so that the results of only completed transactions remain. In the case of single-level transaction structures or those that employ nested transactions but only single-level locks, recovery can be accomplished by "undoing" all lowest-level operations that belong either directly to an incomplete lowest-level transaction or indirectly to an incomplete higher-level transaction. This is possible because the general approach of such transaction structures is to hold all locks until the ends of the highest-level transactions to which they directly or indirectly belong; an "undo" operation for a given operation can return a block to its prior state because the retained locks have prevented operations in other transactions from making other changes in the block. (Actually, some systems create exceptions to this "strict two-phase" locking rule to avoid its concurrency penalties in special situations, but, being exceptions, such departures from the basic rule complicate the recovery system and tend to reduce flexibility.

In a truly multi-level system, however, it is not possible simply to undo all of the lowest-level operations, because replacement of the lowest-level locks by higher-level locks may have permitted other transactions to make further changes on the blocks involved after the lowest-level locks were removed. In principle, this is not a problem, because high-level undo operations can be employed; a high-level undo operation can change X's account balance to its previous value even though it does not return the relevant information to the block that it previously occupied, and this is all that is required. In practice, however, general-purpose mechanisms for implementing the high-level undo operations have been difficult to implement and inconvenient to use. The Weikum et al. approach, for instance, requires a separate operation log for each abstraction level, restricts write operations to the disk during a lowest-level transaction, and requires extraordinary measures to redo incomplete lowest-level transactions. Therefore, although many designers now implement nested transactions, multi-level recovery has not yet been widely adopted.

SUMMARY OF THE INVENTION

The present invention provides a recovery method that makes adoption of multi-level recovery more attractive. Instead of the approach taken in previous multi-level-recovery methods, I have recognized that a relatively simple and flexible multi-level-recovery scheme can be achieved if the right type of existing operation-logging expedient is adapted to multi-level transactions. Specifically, I have recognized that if the commit log record for a transaction at one level is stored with the update log record for the corresponding operation at the next-higher level in a manner similar to that described in Rothermel et al., "ARIES/NT: A Recovery Method Based on Write-Ahead Logging for Nested Transactions," *Proc. VLDB Conf.* (August 1989), Amsterdam, pp. 337-346, then additionally storing with those records the undo information for the higher-level operation permits recovery to be performed in a procedure that is simple and robust and imposes virtually no restrictions on the timing of logging or disk updates.

BRIEF DESCRIPTION OF THE DRAWINGS

These and further features and advantages of the present invention are described below in connection with the accompanying drawings, in which:

FIG. 7 depicts the format of a bottom-level compensation log record;

FIG. 8 depicts the format of a compensation/commit record of the type used for multi-level recovery in accordance with the present invention;

FIG. 10 depicts the format of a compensation/reopen record of the type used for single-level recovery;

DETAILED DESCRIPTION OF ILLUSTRATIVE EMBODIMENTS

Figure 1:
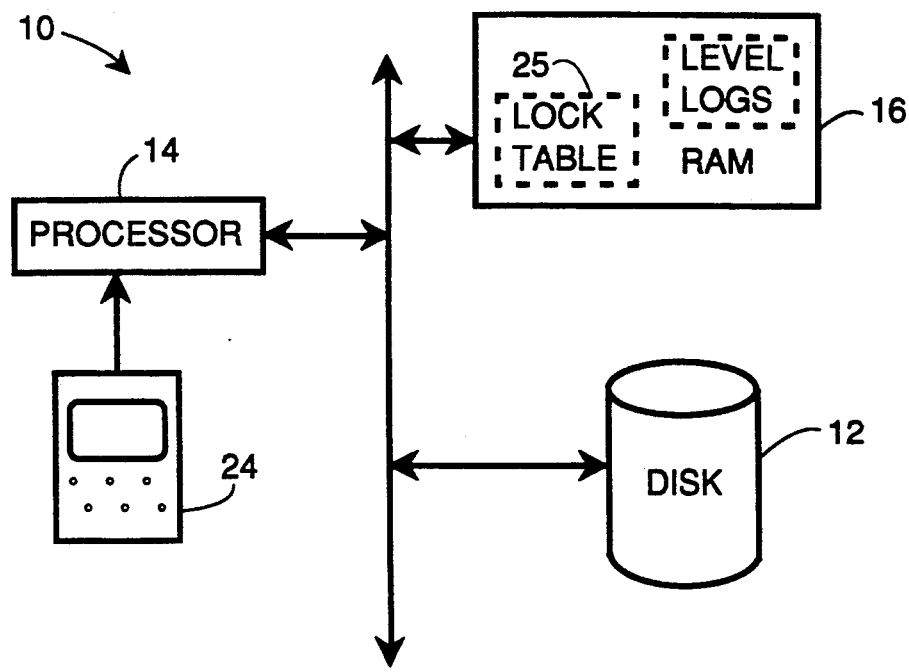
FIG. 1 is a block diagram of a hardware system of a type that might be employed to embody the teachings of the present invention.
Figure 2:
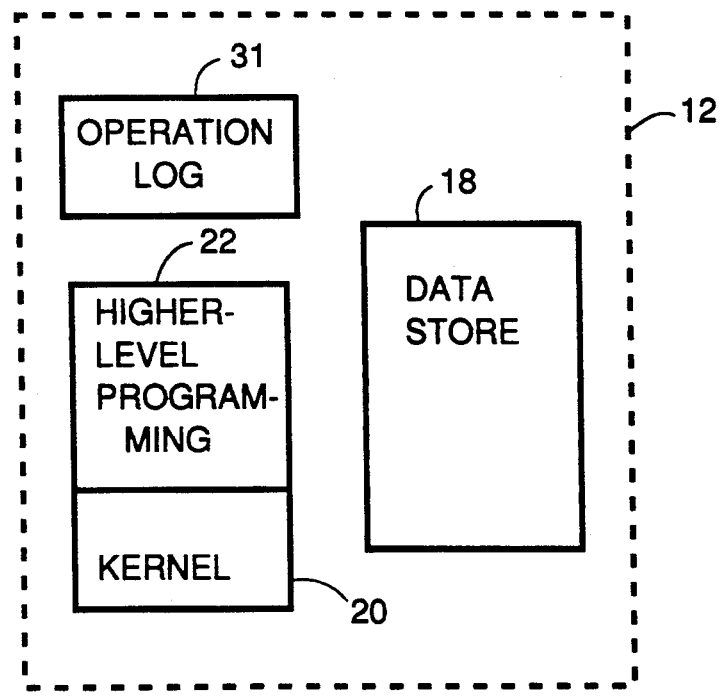
FIG. 2 is a diagram depicting some of the contents of the disk that the system of FIG. 1 employs.

Any of the wide variety of systems that can embody the teachings of the present invention will, like the system 10 of FIG. 1, include a non-volatile memory 12, typically in the form of a disk drive, and a processor 14 for performing operations on the data that the non-volatile memory 12 includes. As a practical matter, the typical system will additionally include a volatile memory such as RAM 16. The invention is directed to recovery from, among other things, processor "crashes" and other transaction aborts in such a manner as to preserve the database information content in general and transaction "atomicity" in particular. Since the volatile-memory contents may be lost in such a crash, the programming that enables the system 10 to provide the features of the present invention reside at least in the non-volatile memory 12, although various parts of it will, of course, be copied into the volatile memory 16 from time to time. Also present on the disk 12 is a data store 18 (FIG. 2), which contains the data whose storage, retrieval, and processing are the purposes of the database system.

It is convenient to think of the database programming as being divided into lower-level functions, referred to as a kernel 20, and higher-level programming 22 that calls upon the functions that the kernel 20 provides. This higher-level programming 22, which defines the set of high-level instructions available to an ultimate user, is typically written by someone other than the designer of the kernel, which is concerned with various low-level functions such as scheduling operations, organizing storage, and recovering from aborted transactions such as those caused by processor crashes.

The principal object of the higher-level programming 22 is to define transactions. The present invention provides multi-level recovery when it is used with higher-level programming designed for such recovery. That is, a transaction designer who wants to take advantage of the multi-level-recovery aspects of a kernel that employs the present invention must define the transactions in such a manner that they result in a multi-layer structure. This typically means that the objects of one level's transactions, which often appear as the transaction (subroutine) arguments, occupy a level of abstraction different from that occupied by objects of another layer's transactions.

For instance, the object resources at one level may be bank-account records, which the transaction deletes, inserts, modifies, etc., while those at a lower level are disk blocks, which are read and written by inherently atomic operations. For each transaction at a given level, the transaction designer must also program "undo" transactions at the same level, i.e., transactions that operate on the same types of objects. A transaction for deleting an account record, for instance, would have to be accompanied by an inverse transaction for inserting a record. Moreover, the programmer must define for each transaction at a given level a lock at the same level, i.e., a lock whose object is the same as the object of the corresponding transaction.

As is explained above, a transaction at one level can be an operation at the next-higher level in a multi-level organization, and the object of the operation at that higher level is the type of resource associated with that level. Similarly, the undo operation that the designer provides for an operation at one level has an object at that level but may be a transaction at the level below.

According to the present invention, the database system can recover in a multi-level manner from aborts of thus-defined transactions with little additional effort on the part of the transaction designer other than the lock and undo-transaction design, and no restrictions on logging and disk writing other than that a write-ahead-logging protocol need to be observed.

The manner in which the kernel 20 provides this capability can best be understood by considering the manner in which the kernel operates in response to interruption of multi-level transactions. Suppose a user is an operator sitting at a terminal 24 (FIG. 1). By making keystrokes (for instance), the user requests one of the high-level transactions that the high-level programming 22 has defined. The processor 14, which has copied selected contents of the kernel 20 and higher-level programming 22 into its (relatively fast) volatile memory 16, performs the requested transaction, scheduling its constituent operations and those of other requested transactions in accordance with a scheduling routine of the type conventionally employed by database kernels.

As was described above, a transaction typically includes a plurality of operations. The object of an operation at a given level is one or more resources at the same level. In many systems, the bottom-level resource is a disk block. We will therefore begin the discussion by considering performance of a bottom-level operation on a disk block.

Figure 3:
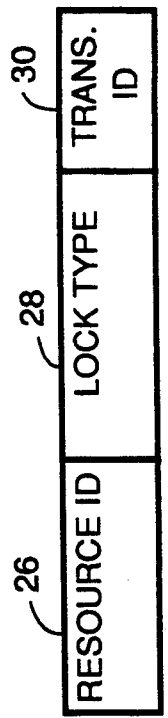
FIG. 3 is a diagram of typical lock-table record produced by the database of the illustrated embodiment.

Before a requested operation accesses an object resource, it checks a lock table 25 that it typically maintains in the RAM 16. An operation imposes a lock by entering a corresponding lock record in the lock table 25. The lock record may, for example, be of the form that FIG. 3 depicts. The first field 26 contains the ID of the locked resource. In the case of a bottom-level lock, the locked resource is one of the disk blocks, while the locked resource at some other level might be an account record.

If a kernel permits the transaction designer to use multiple lock types, its lock records will have fields corresponding to the lock-type field 28. The use of only a single, exclusive-use lock type would prevent essentially all concurrent accesses of a common resource by different transactions. Since not all concurrent accesses destroy the atomicity and serializability that it is the object of a lock to protect, transaction designers typically classify into types the locks that their transactions' operations acquire, and they define for each transaction's operations the types of locks by which those operations will allow themselves to be deterred.

Every time a transaction starts, it is assigned a transaction ID. Field 30 contains the ID of the transaction to which the lock-imposing operation belongs. When a transaction finishes ("commits") in a truly multi-level transaction structure such as those to which the present invention is directed, all lock records containing that transaction's ID are deleted.

If, on checking the lock table, the processor finds no entry whose resource-ID field 26 designates the disk block to which the requested (bottom-level) operation is directed, it places an appropriate lock record in the lock table and performs the operation.

In performing a typical operation, the processor 14 may read data from the disk drive's data store 18, process it, store intermediate results in a "cache" of selected disk contents in the volatile memory 16, and at some time write ("flush") the operation results back to the disk 12. It is not until those results are written back to the disk 12 that they are "durable," i.e., that they can last beyond the occurrence of a processor crash. But if the crash causes the operation's encompassing transaction to abort, it is typically necessary to "undo" the operation in order to protect that transaction's atomicity. Before an operation's results become durable, therefore, enough information must also be durably stored to make undo operation possible.

For bottom-level transactions, many conventional ways of accomplishing this may be employed to practice the present invention. One of them is the logging method, which we will describe here because it parallels the logging that the present invention employs for higher-level operations. The logging method employs a durable log that contains a record of various operational events, such as updating a data block with the results of an operation. A record of a bottom-level update may have a format illustrated in pertinent part in FIG. 4. These records are entered into the log in the sequence in which their corresponding operations occur.

Figure 4:
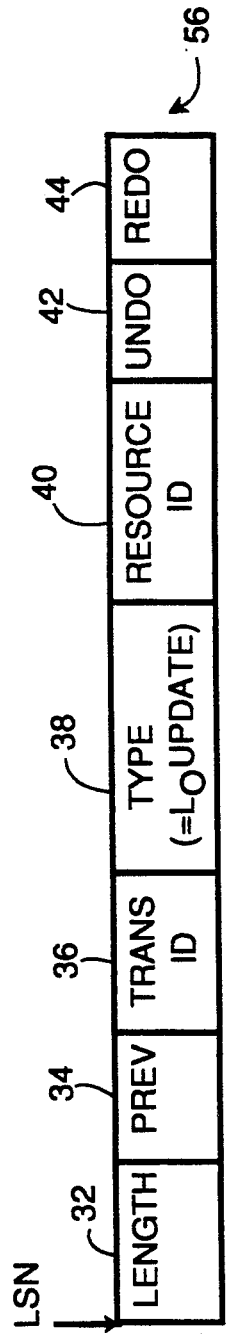
FIG. 4 depicts the format of a bottom-level update record in the database system's operation log.

Storage-efficiency considerations normally result in allowing log records to vary in length, so FIG. 4 depicts the first field 32 as containing an indication of the log record's length. For reasons that will be explained below, each record that represents an operation other than the start of a transaction includes a previous-operation field 34, which contains the log sequence number ("LSN") of the same transaction's previous operation. (The start of a transaction, like some other types of loggable events, will be referred to as an "operation" even though it involves no data manipulation.) An operation's LSN is typically the starting address of that operation's log record. Field 36 contains the transaction ID of the transaction to which the recorded operation belongs.

Field 38 indicates the log-record type, on which the recovery operation will base its interpretation of other fields in the record. The type specifically depicted in FIG. 4 is the "update" log record, which represents some type of writing of a disk block. As will be explained below, logging occurs not only during normal operation but also during the procedures used to recover from aborts. Some logging schemes use different type codes to distinguish normal, "forward" updates, which can be rolled back in a recovery procedure, from "compensation" updates, which are used in the recovery operation itself and are not to be rolled back. The illustrated embodiment adopts this approach, which helps to expedite a second recovery operation necessitated by an aborted first recovery. Another type of record is the "start" log record, which represents the start of a transaction. According to the present invention, another type of record, the "commit" record representing the end of a transaction, has a format different from that depicted in FIG. 4 for non-top-level forward transactions, and it will be described below.

An update record includes a resource-ID field 40, which identifies the object of the operation. In bottom-level-operation records, the object field always contains the address of a disk block.

If the log record is of the update type, it includes an undo field 42, which contains the information necessary to undo the operation whose occurrence the record documents. This information includes not only the name of the undo routine for the logged operation but also specific data, such as the data previously contained in the part of the block that the operation changed.

As was stated above, an operation is always logged before the resultant changes are made in the disk contents. If a processor crash occurs between a bottom-level operation's logging and the flushing of that operation's results to the disk, part of the recovery process is to "redo" the operation. The log record of FIG. 4 therefore includes a redo field 44, which, like undo field 42, contains data and routine-identifying information. As a practical matter, much of the undo and redo information may be the same, so it may not be as segregated as the two fields 42 and 44 suggest.

Figure 5:
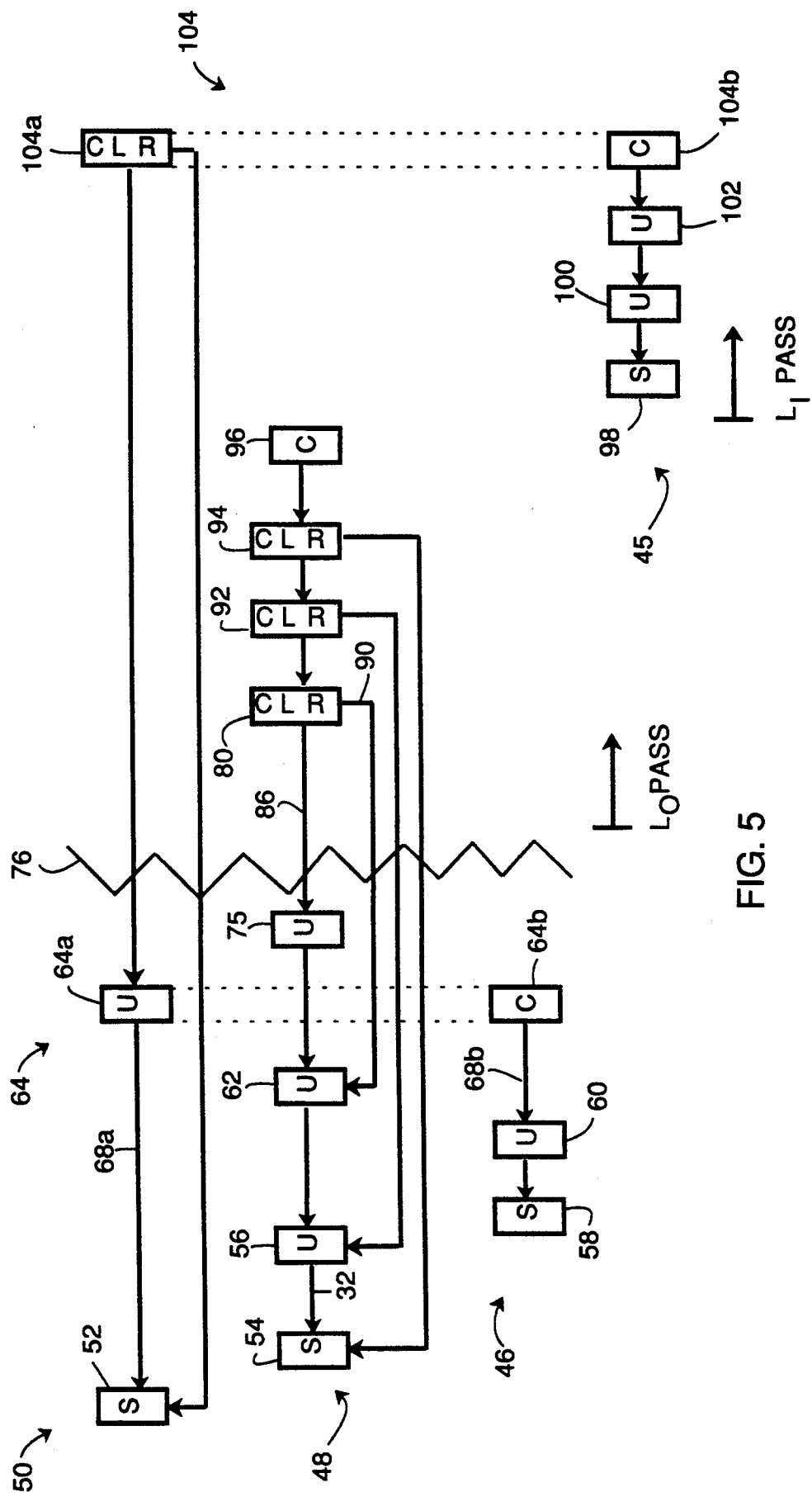
FIG. 5 is a diagram of a simple sequence of operations used to explain the manner in which a database embodying the teachings of the present invention operates.

We will now consider a simple sequence of operations that illustrates the relationship between successive levels by showing the relationship between bottom-level ($L_0$) operations and transactions and those at the next higher level ($L_1$). FIG. 5 depicts this sequence.

The boxes in FIG. 5 represent operations. In particular, their horizontal positions represent the times at which the operations are logged and thus their order within the serially organized operation log 31; boxes further to the right represent records added later to the log. Arrows represent pointers such as the previous-operation field 34 of FIG. 4. Horizontally aligned boxes represent records of operations in the same transaction, i.e., records having the same contents in their transaction-ID fields, so FIG. 5 represents four transactions. Transactions 45, 46, and 48 are $L_0$ transactions, while transaction 50 is an $L_1$ transaction of which transactions 46 and 48 ar constituent operations. (Transaction 45 is an undo operation for the $L_1$ operation that consists of transaction 46.)

The actual logging of a loggable event in durable memory may follow not only that event but also subsequent events by some time; the loggable event usually occurs in the cache, and the write-ahead-log protocol requires only that logging occur before the operation's results in the cache are flushed to the disk. But it is less cumbersome to speak of an event and the resultant logging as occurring before any other events. Since events are logged in the order of their occurrence, it is rarely confusing to adopt this expedient, so we will do so here.

The sequence of FIG. 5 begins with a request by a user—the "user" at this level typically being an $L_2$ transaction—that the $L_1$ transaction 50 be performed.

The processor 14 begins the transaction and logs the $L_1$ operation's start with an $L_1$ start record 52, which represents no actual change of the data but is used in recovery, as will be explained below in connection with another start record. An $L_1$ start record includes fields corresponding to the length, transaction-ID, and type fields 32, 36, and 38 of FIG. 4. Since the $L_1$ transaction 50 is also an $L_2$ operation, it will access one or more $L_2$ resources. As it proceeds, therefore, it precedes each such access with a check of the lock table for a lock on the $L_2$ resource to be accessed and continues only after any lock on that resource has been lifted. We will assume in the remaining discussion that no locks are present at any level except those acquired by the operations of the illustrated sequence.

The $L_1$ transaction 50 then begins its first operation, namely, the $L_1$ operation consisting of the $L_0$ transaction 48. $L_0$ transaction 48 commences by logging a start record 54 and making any necessary lock-table checks. $L_0$ transaction 48 then proceeds with its first $L_0$ operation by checking the lock table for the disk block to which that operation is directed. Under our assumption, that block is not already locked, so the operation continues with acquisition of its own lock, access of (typically the cache copy of) the object disk block, and logging of an update record 56.

Meanwhile, having commanded the start of its first $L_1$ operation, the $L_1$ transaction 50 commands the start of its second $L_1$ operation, namely, $L_0$ transaction 46. This transaction starts as transaction 48 did, and its initial stages are reflected in the operation log by a start record 58 and an update record 60. These follow each other in the log and are in turn followed by another update record 62, which represents an update in the first $L_0$ transaction 48. All of these records are either update records and thus have the format depicted in FIG. 4 or are start records having a subset of the FIG. 4 fields.

According to the present invention, however, the next record 64 follows a format that is considerably different, as is suggested by its FIG. 5 representation's having two parts 64a and 64b that straddle two levels. This record is both the commit record for the $L_0$ transaction 46 and what can be thought of as an update record for the $L_1$ operation 46. It is an $L_1$ update record in the sense that it indicates that updates for all of the constituent $L_0$ operations of the $L_1$ operation 46 have now been completed.

This use of a double record, i.e., one having two transaction IDs, was introduced by the ARIES/NT method to implement the provisional nature of a subtransaction's commitment in a nested transaction: if a crash necessitates a recovery operation, the record's status as a commit record for the lower-level transaction identified by one of that record's transaction IDs will prevent that transaction from being rolled back only if, at the time of the crash, the operation log has also received a commit record for the higher-level transaction that the double record identifies. Unlike previous multi-level recovery methods, the present invention adapts this feature from the logging approach that ARIES/NT's single-level-recovery method uses for nested transactions. Although the ARIES/NT method is not itself readily generalizable to multi-level recovery, incorporating upper-level undo information in the two-part record 64, together with a "decoupling" feature to be described below, enables the present invention to avoid most of the complications and restrictions that afflict other approaches to multi-level recovery.

Figure 6:
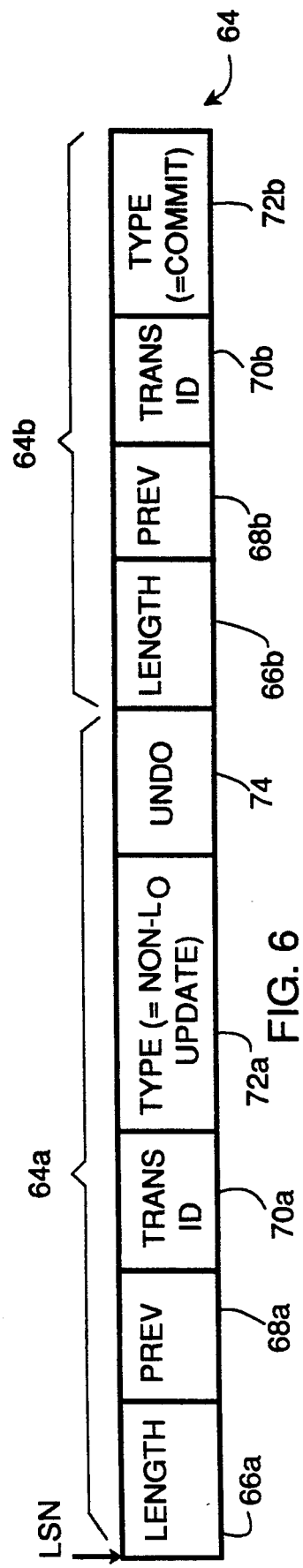
FIG. 6 is a block diagram of an update/commit record used to implement multi-level recovery.

FIG. 6, which depicts one possible double-record format, shows that each of the two parts 64a and 64b has some of the fields of the FIG. 4 record. Specifically, parts 64a and 64b have respective length, previous-record, transaction-ID, and type fields 66a and 66b, 68a and 68b, 70a and 70b, and 72a and 72b whose contents roughly parallel those of corresponding fields 32, 34, 36, and 38 of FIG. 4.

The two parts 64a and 64b relate to different levels. For example, the first type field 72a indicates an update of the results of the $L_1$ operation 46, while the second type field 72b indicates that the $L_0$ transaction 46 has committed. Similarly, the previous-record field 68a of the first part is, as the corresponding arrow 68a of FIG. 5 indicates, a pointer to the record 52 for the last $L_1$ operation of the same $L_1$ transaction 50, while the second previous-record field 68b is a pointer to the record 60 for the last $L_0$ operation of the same $L_0$ transaction 46. Also, while the first transaction-ID field 70a contains the ID of the $L_1$ transaction 50 of which now-committed $L_0$ transaction 46 is a constituent $L$ operation, the second transaction-ID field 70b contains the ID of the $L_0$ transaction 46 whose commitment it is the purpose of record part 64b to record.

A final field, which distinguishes this record as one for a system that employs multi-level recovery, is the transaction-undo field 74. As was explained above, it is possible to nest transactions—i.e., to perform transactions as constituent operations and thus log the commitment of one transaction as an update of a (higher-level) operation—without employing a multi-level recovery method. Undo recovery for such a scheme would undo higher-level operations by treating them as lower-level transactions and undoing the constituent operations of the lower-level transactions; that is, all undo operations would occur at the bottom level, so it would be only the bottom-level update records that would need an undo field. For reasons discussed in the background, however, this approach can be quite detrimental to concurrency because it requires long retention of relatively restrictive locks.

In multi-level recovery, on the other hand, a committed high-level operation is undone at the high level, and the ability of a high-level undo operation to undo a high-level forward operation depends only on the corresponding high-level resource's having been locked between the forward and undo operations; it does not depend on maintenance of locks on the lower-level resources to which the high-level forward operation's constituent-lower level operations were directed. If a lock of the high-level object resource is acquired during the lower-level transaction, therefore, the lower-level—and more-restrictive—locks acquired by that lower-level transaction's constituent operations can be released when that transaction commits.

This is what happens upon the event that record 64 reflects; i.e., the lock table receives a lock record directed to each $L_1$ resource to which operation 46 is directed, and it loses the (more-restrictive) $L_0$ lock acquired at the beginning of the operation that update record 60 documents. With locks maintained only at the $L_1$ level, undo recovery will have to be performed at that level, and field 74 contains the data and routine-identifying information for that $L_1$ operation. Undo field 74 is thus like undo field 42 except that it refers to a higher-level undo operation. Although $L_0$ transaction ($L_1$ operation) 46 is depicted as comprising only one loggable event other than its start and commitment, an $L_1$ or higher operations may in general be complicated enough to have as its object more than one $L_1$ resource, and part of the operation may be to identify those resources according to certain criteria. For this reason, the $L_1$ update record 64a of FIG. 6 is not shown as having a resource-ID field separate from the transaction-undo field 74, which may identify a routine for identifying object resources not explicitly identified in the record.

Transaction 46 has now committed, but transaction 48 has not, and it proceeds with an $L_0$ operation documented by a further update record 75. Before transaction 48 can commit, however, a processor crash occurs that FIG. 5 represents with a jagged line 76. That is, the database has been left in a state in which transactions 48 and 50 are both "active": they have both started but not committed. To provide the required atomicity, therefore, a recovery process must occur before ordinary database operation resumes.

Accordingly, when the processor restarts and the system operator requests that it run the database program, the database program initializes by, among other things, examining the operation log to identify transactions for which the disk does not have the results through transaction commitment and then rolling them back so that the results of only complete transactions remain in the durable data store 18. The overall approach is to proceed backward through the operation log and undo any log-recorded operation that belongs to a transaction whose commit record it did not previously encounter in the backward scan. As the above discussion of the write-ahead-log protocol indicated, however, the presence of a log record does not necessarily mean that the results of the corresponding operation have yet been flushed to the non-volatile data store 18; i.e., there may not yet be anything there to undo. Since not all undo operations give the right results if the object resource does not reflect the original-operation results, a redo procedure precedes the undo procedure. The redo procedure also serves to make durable in the database the results of committed transactions that are not to be undone.

One type of redo operation that one might use in implementing the present invention scans forward from a point in the log indicated by a conventionally established checkpoint, reading each $L_0$ update record's resource field and then checking the disk data block designated thereby for the contents of its log-sequence-number ("LSN") field. This field indicates how recently that data block was durably updated. As was stated above, the log-writing routine assigns log sequence numbers to log records in a monotonically increasing sequence. That routine therefore always has available a next-record pointer representing the location of the next log record to be written. When the persistent data store 18 is updated by replacing disk-block contents with those of the corresponding modified ("dirty") volatile-cache blocks, a copy of the then-current next-record pointer is placed in the disk block's LSN field. Therefore, if the LSN field of a block in the disk data store 18 has an LSN higher than that of the log record that designates that block, the disk block has been updated since the operation reflected in the log record, and that operation does not have to be redone. Otherwise, it is redone and the results are written into the designated disk data block along with the LSN of the next record in the redo scan.

Note that the redo process does not affect the log record, so if the system crashes again during the redo process, the next re-initialization starts a redo process that is exactly the same except that LSN checking will determine that the operations that were redone and had their results flushed to the disk data store 18 in the first redo process do not have to be redone in the second.

When the redo procedure has ended, the undo procedure begins. Since all undo operations for a given level are based on the assumption that no transactions at any lower level remain active, the backward process must be performed for each level individually, beginning with the bottom level. Consequently, as the bottom-level undo process proceeds backward through the log record, it performs undo operations only for log records that represent $L_0$ operations. At the same time, however, it may also copy every other, higher-level log record into a level log, typically compiled in the RAM so as to expedite subsequent undo passes, dedicated to the level to which that log record's operation is directed.

There are many possible ways for this segregation process to recognize the level to which a log record belongs. One is to have each log record's record-type field include an indication of its level. A preferable alternative is to compile a transaction-level table during the redo pass by inferring each transaction's level from the number of level-straddling double records such as record 64 it takes to make a "chain" from that transaction to a bottom-level transaction.

In any event, the undo phase of the recovery procedure begins with the last $L_0$ operation to occur, i.e., with the first $L_0$ operation encountered in a backward scan of the log. Update record 75's transaction-ID field identifies $L_0$ transaction 48, for which the redo procedure has not encountered a commit record. That operation's transaction therefore is still active, so its operations must be undone to preserve atomicity. The undo operation identified by record 75's undo field is accordingly performed, and a compensation log record 80 documents that undo operation. FIG. 7 depicts a typical compensation log record in pertinent detail.

Like the record of FIG. 4, that of FIG. 7 includes length and type fields 81 and 82, which have the same purposes as the corresponding fields 32 and 38 of FIG. 4. A transaction-ID field 84 identifies the transaction that contains the operation undone by the "inverse operation" that the compensation log record documents. A previous-operation field 86 similarly contains the LSN of the record for the previous operation in that transaction. Like the corresponding field 34 in the FIG. 4 $L_0$ update record, field 86 is intended primarily to save time in aborting individual transactions in response to a user command rather than in crash recovery, in which all log records must be accessed.

The purpose for logging the undo operations with CLRs is to record enough information to expedite recovery from a crash in the recovery procedure itself. When such a crash has occurred, the CLR's transaction-ID field identifies it to the resultant second recovery procedure as representing a further operation in the transaction of whose operations it is part of the rollback procedure; that is, if the recovery operation encounters a CLR without previously having encountered a commit record for the same transaction, the recovery operation concludes that the transaction's operations must be undone. But it is most efficient for the CLR-represented operation itself not to be undone, because to do so would simply reinstitute the effects of a "forward" operation that is known to require undoing; i.e., if the CLR-represented operation is undone, it will simply have to be done again when the second recovery procedure's undo scan reaches the record of the forward operation for which the CLR-represented operation compensates.

It is to prevent this duplication that a CLR's record-type field in the illustrated embodiment distinguishes it from an ordinary update record; in response to the record-type field's identifying a record as a CLR, the undo process can refrain from performing an undo operation in response to that record. The exemplary record of FIG. 7 therefore does not include an undo field. It does need a redo field 88, though, because of the write-ahead-logging protocol. Field 88 is called a "redo" field because, like field 44, it contains the information used in the redo process to re-execute the (undo) operation that its record 80 documents. Although the thus-identified routine is thus a "redo" of the CLR-represented operation, it is an "undo" of the transaction for which the CLR-represented operation compensates; i.e., redo field 88's contents are the same as those of record 75's undo field. Since record 80 documents an operation at the $L_0$ level, the identification of its object resources is depicted as occurring in a field 89 separate from the redo field 88.

Finally, since the undo process in the illustrated embodiment will not undo the CLR-represented operation, it should not undo the operation for which the CLR-represented operation compensates, either, so the CLR in the illustrated embodiment includes a next-undo field 90, into which have been copied the contents of the previous-operation field (such as field 34 of FIG. 4) from the record of the "forward" operation whose undoing the CLR records. This field therefore points (by LSN, for instance) to the log record of the next operation to be undone in the same transaction. In proceeding backward through the log, the undo process ignores all records containing the same transaction ID until it encounters the one to which the first-encountered CLR of the same transaction pointed.

Having performed the undo operation identified by record 75's undo field and logged by record 80, the undo scan proceeds to record 64, which was described in connection with FIG. 6 as being both an $L_0$ commit record and an $L_1$ update record. As an $L_0$ commit record, it requires no undo operation, and as an $L_1$ update record, it requires undoing during the $L_1$ undo pass, not during the current, $L_0$ undo pass. It is therefore copied into the $L_1$ level log without the addition of any record to the operation log 31.

The next $L_0$ update record 62 corresponds to an operation in uncommitted transaction 48, so its operation is undone in an operation recorded in the next CLR 92.

Belonging to a transaction 46 pronounced committed by previously encountered commit record 64b, the operations represented by the next two records 60 and 58 that the recovery procedure encounters are not undone and thus cause no additions to the operation log 31. This is true even though transactions 46's commit record 64b is part of a double record whose other part 64a designates an L transaction 50 the absence of whose commit record has identified it as active. The reason for this is that the presence of an undo field 74 in record 64 identifies the $L_1$ operation consisting of $L_0$ transaction 46 as being one for which an $L_1$ undo operation is available (and, consequently, for which the locks of its constituent operations were released when transaction 46 committed). Any undoing of transaction 46 will therefore occur by way of an $L_1$ operation, not by individually undoing its constituent operations.

An undo operation documented by CLR 94 compensates for the operation that the next-encountered record 56 represents, and the recovery operation then adds to the operation log a normal commit record 96 in response to start record 54 so that a further crash will not cause the operations of transaction 48 to be undone again. (In practice, the type field of record 96 would usually distinguish it from commit records for forward transactions—i.e., record 96 would actually be an "abort" record—so as to enable a housekeeping routine to strip the log of the records of aborted transactions that have already been rolled back. For present purposes, however, an abort record is simply a commit record.) Finally, the $L_0$ undo process identifies start record 52 as belonging to the $L_1$ level because, for instance, its transaction-ID field specifies a transaction that the process has previously identified as being at level $L_1$, so it copies that record into the $L_1$ level log without adding to the operation log. This completes the $L_0$ undo pass for the forward operations whose records FIG. 5 depicts.

The recovery process then embarks upon the next, $L_1$ undo pass. If the level logs mentioned above are implemented, the backward scan for this level begins in the RAM-resident $L_1$ level log, although it may have to finish up in the operation log 31 if the $L_0$ pass ended without copying all necessary $L_1$-related records into the $L_1$ level log. The first-encountered $L_1$ operation record 64 in that log represents an $L_1$ operation in an $L_1$ transaction 50 for which the recovery process has not encountered a commit record. (Preferably, only such uncommitted-transaction operations are copied into the level logs.) This operation must therefore be undone by performing the $L_1$ undo operation that record 64's undo field 74 identifies.

For reasons similar to those discussed in connection with $L_0$ CLRs 80, 92, and 94, it is preferable for a subsequent crash not to cause the field-74-identified $L_1$ undo operation to be undone itself, so the undo process at level $L_1$ (and higher levels) in one sense follows the same rules against redoing CLR-represented operations that it does at $L_0$.

But a complication arises from the fact that an $L_1$ undo operation is an $L_0$ transaction, which typically consists of a plurality of constituent $L_0$ operations. For a variety of reasons, it would greatly complicate recovery if preventing the undoing of the field-74-identified $L_1$ undo operation were accomplished by preventing its constituent $L_0$ operations from being undone. For example, it would add another layer of complexity for the recovery process invoked by an abort of that $L_0$ undo transaction to (1) respond to a record of one of that transaction's constituent operations by searching for record 64 so as to determine what transaction to resume and (2) count the already-logged update records of that transaction's constituent operations to determine where to resume it. In most cases, moreover, the crash would have lost too much prior-state information for even these efforts to reveal where to resume the transaction.

The illustrated method therefore so logs the constituent operations of a compensation (undo) transaction that undo operations are performed for them if the compensation transaction aborts; i.e., although committed compensation transactions are not undone, the constituent operations of aborted ones are. If the undo transaction is logged in a manner described below, undoing its constituent operations can be treated like undoing any other forward operations, so no special restrictions need to be placed on their performance or on the timing with which their results are written to the disk.

When the recovery process depicted in FIG. 5 encounters the $L_1$ update record 64 depicted in FIG. 6 in its (backward) $L_1$ undo pass, it begins the field-74-identified $L_1$ compensation operation—i.e., the $L_0$ compensation transaction—by storing start record 98 in the operation log 31 and performing that compensation transaction's operations, recording them with normal $L_0$ update records 100 and 102. It then notes the transaction's completion with a compensation/commit log record 104.

FIG. 8 depicts log record 104. Its format is the same as that of update/commit record 64 of FIG. 6, but in the illustrated embodiment, the record-type field 106a of the $L_1$ record part 104a identifies it as a CLR rather than a forward update record. If transaction 45 has committed, therefore, CLR record part 104a will be present and prevent the recovery operation from responding to record 64a by performing again the $L_1$ undo operation that $L_0$ transaction 45 has already performed.

Note that, although record part 104a identifies the operation that it documents as a compensation transaction, the records 98, 100, 102, and 104b that document its constituent operations are the same as those for forward transactions. In a subsequent recovery procedure, therefore, they are treated just like forward operations. That is, if transaction 45 has not committed, its constituent operations will be undone.

Further note that the only connection in the log between parent transaction 50 and undo transaction 45 occurs in the double commit record; none of the other records for undo transaction 45 reference transaction 50. The distinction between this "decoupling" feature, which enables the present invention to perform multilevel recovery in a simple, robust manner, and the corresponding feature of the ARIES/NT approach, which is limited to flat recovery, is best discerned by considering the manner in which the present invention can treat nested transactions that are not designed for multi-level recovery.

Figure 9:
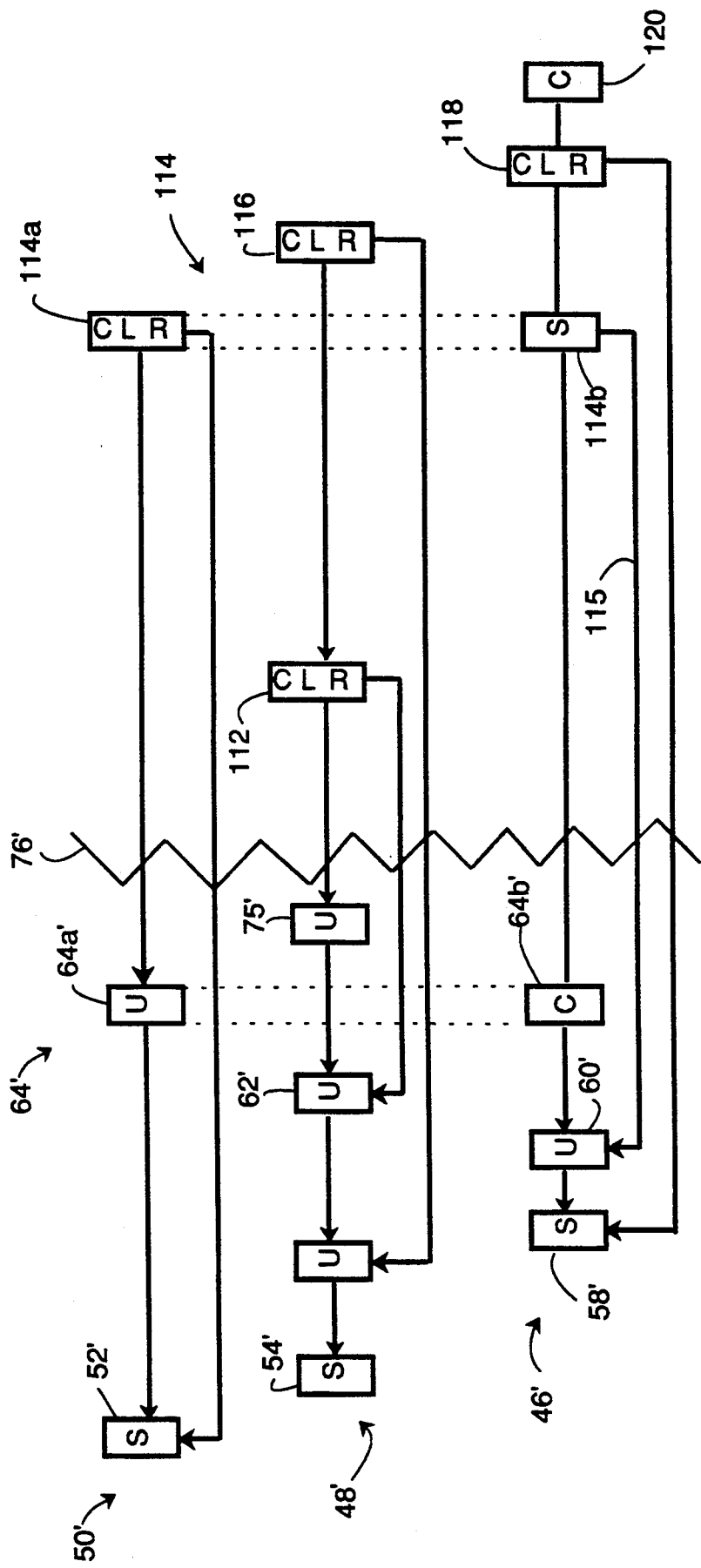
FIG. 9 is a diagram of a sequence of operations that illustrates single-level recovery of nested transactions.

FIG. 9 depicts a forward sequence essentially the same as that of FIG. 5 with the exception that transaction 46' in FIG. 9 is one for which the transaction designer has decided to implement flat recovery rather than multi-level recovery. For records logged before the crash, therefore, FIG. 9 uses primed versions of the reference numerals for corresponding records in FIG. 5. Database operations that occur before the crash 76' in FIG. 9 are essentially the same as those before the crash 76 of FIG. 5, with two exceptions. The first exception is that, since the recovery is not to occur at multiple levels, the fact that $L_1$ transaction 50' is still active causes the locks acquired during its subtransaction 46' to be retained even after transaction 46' commits. (The locks' transaction IDs are, however, changed to that of transaction 50'.) That is, transaction 50' "inherits" the locks of its committed constituent operation, transaction 46'.

The other exception is that log record 64' differs from the record depicted in FIG. 6 in that it does not have a field, corresponding to field 74, that identifies a higher-level undo operation; since flat recover is to be implemented, undo recovery occurs only at the bottom level, so record 64 requires no special $L_1$ undo information, as will now be explained.

When a crash occurs, operations are redone in the manner previously described, and the undo procedure then starts. This is a flat recovery operation: the entire undo procedure occurs in one pass and at the $L_0$ level. An undo operation recorded by CLR 112 is the same as the operation recorded by CLR 80 of FIG. 5; it compensates for the operation recorded by update record 75'.

Having dealt with record 75', the undo pass proceeds to the next log record 64'. Here the flat recovery method for a nested transaction differs from the multi-level recovery. In the multi-level recovery, the undo procedure encountered a record of the type depicted in FIG. 6, i.e., one that identified a higher-level undo operation. The recovery procedure responded to such a record by placing it in the $L_1$ level log and thereby holding compensation for its $L_1$ operation in abeyance until the next, $L_1$ undo pass. In the $L_0$ pass, the recovery treated that record simply as a commit record, i.e., as representing a transaction that had already been committed and so did not need to be redone.

Unlike record 64, however, record 64' identifies no higher-level undo procedure by which the higher-level operation can be undone, and the recovery procedure concludes that, if the higher-level operation must be undone, the undo operation must be performed at the lower level, namely, by re-opening its constituent $L_0$ operations. So when it reaches an update/commit record like record 64', which identifies an uncommitted higher-level transaction but no higher-level undo operation, the recovery operation does not copy it into a higher-level log. Instead, its undo pass responds to the commit-record part 64b' by adding to the operation log 31 a two-level compensation/reopen log record 114. The format of compensation/start log record 114 is similar to that of compensation/commit log record 104 depicted in FIG. 8 except that record 114 additionally includes a next-undo field represented by line 115 in FIG. 9. This field's purpose will be explained shortly.

The recovery procedure's backward operation-log scan proceeds to record 62', for which the recovery procedure performs the undo operation identified by that record and documents the undo operation's occurrence with a compensation log record 116. The recovery procedure similarly performs the undo operation identified by update record 60' and records its occurrence by adding compensation log record 118 to the log.

This is where the present invention's decoupling feature stands out in boldest relief. Although the reason for undoing the record-60'-represented operation despite the commitment of its transaction 46' is that the parent 50' of transaction 46' is still active, CLR 118 does not identify transaction 50, and a subsequent recovery process is free to treat CLR 118 just like a CLR that represents undoing an operation from an uncommitted transaction. This differs from ARIES/NT, in which every log record for undoing a committed transaction's constituent operation is logged with a CLR designating the committed transaction's parent (or whatever other "ancestor" is a top-level transaction). As the discussion accompanying FIG. 5 demonstrated, this decoupling enables the present invention to perform multi-level recovery in a simple, robust manner.

The last procedure depicted in FIG. 9 for the undo recovery process is its encounter of start record 58'. The recovery process therefore documents completion of the rollback of transaction 46' by adding to the log a (typically abort-type) commit record 120 designating that transaction so that, in the event of a subsequent interruption in the rollback of the transaction 50' of which transaction 46' is a constituent part, the recovery process will identify transaction 46' as one that does not have to undone.

On the other hand, if the recovery operation is interrupted at a point in the undo process just before that process encounters the start record 58', the next recovery operation will encounter CLR 118, and, since that record is identified as a CLR, will not undo the operation that it represents. Moreover, that next recovery process will note the contents of CLR 118's next-undo and transaction-ID fields and ignore any record having the noted transaction ID until it encounters one having a log sequence number equal to the noted next-undo-field contents.

Although one of the differences between the flat-recovery sequence of FIG. 9 and the multi-level recovery sequence of FIG. 5 is that the FIG. 9's upper-level CLR 114a was recorded with a start record, whereas CLR 104a was recorded with a commit record, this is not a necessary distinction. Another embodiment of the present invention, for instance, might operate in accordance with the sequence that FIG. 11 depicts.

Figure 11:
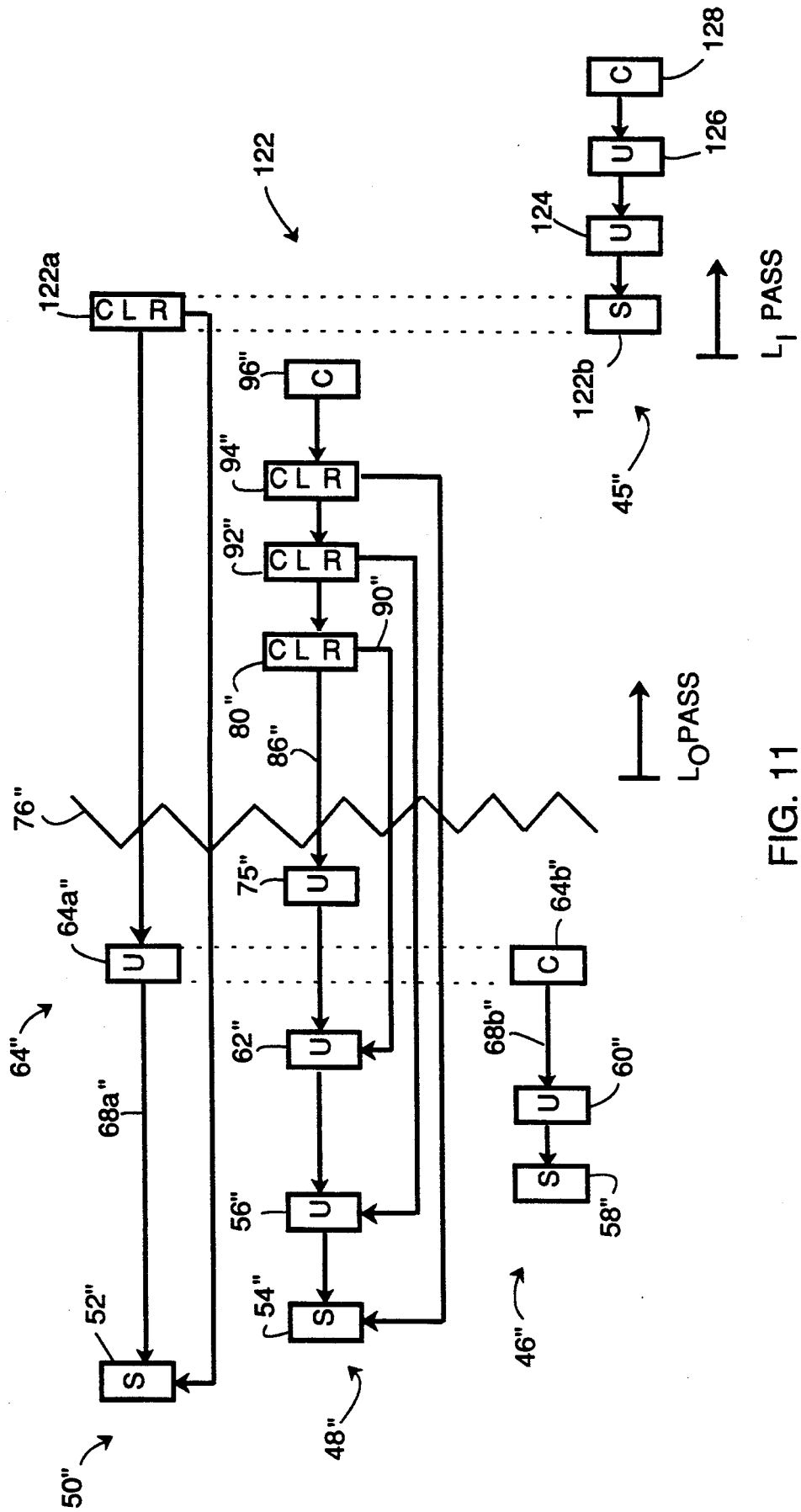
FIG. 11 is a diagram of a sequence of operations that illustrates multi-level recovery in accordance with an alternate embodiment of the present invention.

The part of the FIG. 11 sequence before the start of the $L_1$ recovery pass is exactly the same as that of the FIG. 5 sequence, and the reference numerals for the records in that part of the sequence are primed versions of those for corresponding records in FIG. 5. In particular, transaction 46" is like transaction 46 in that it is intended for multi-level recovery. The difference occurs when the $L_1$ recovery pass in the FIG. 11 sequence encounters double record 64a" in the $L_1$ level log. Rather than logging the compensation transaction's start with a regular start record like record 98 of FIG. 5, the recovery procedure in this embodiment logs it with a double compensation/start record 122. It then logs the remainder of the compensation transaction 45" with ordinary update records 124 and 126 and, instead of a double record like record 104 of FIG. 5, a single (abort-type) commit record 128.

Figure 12:
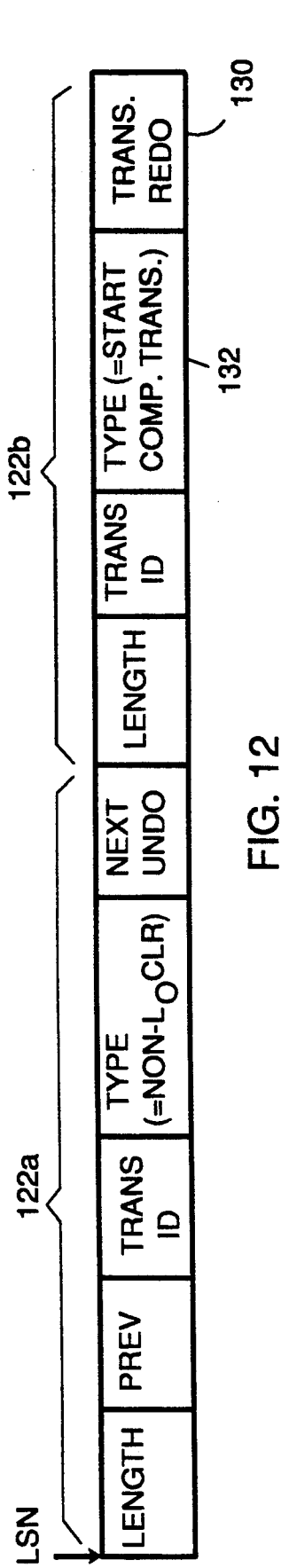
FIG. 12 depicts the format of a compensation/start record of the type used in the alternate embodiment.

FIG. 12 depicts record 122. It shows that the format of record 122 differs from that of double record 104 in that, for reasons to be explained shortly, it additionally includes a transaction-redo field 130, and its record-type field 132 identifies it as a start record instead of a commit record.

If an abort occurs in a recovery process in which compensation transaction 45" has already committed, the subsequent recovery operation operates just as it does in the FIG. 5 embodiment when transaction 45 has committed. If transaction 45" aborts, however, the process is more complicated than recovery from a transaction-45 abort because the $L_1$ CLR 122a of FIG. 11 has already been written when compensation transaction 45" aborts, while $L_1$ CLR 104a of FIG. 5 has not when transaction 45 aborts.

The significance of record part 122a's being a CLR is that, if it is encountered in recovery from a subsequent crash that aborts the transaction to which its operation belongs, it does not trigger an $L_1$ undo operation, for reasons previously discussed in connection With the $L_0$ CLRs. As was also mentioned above, however, the constituent operations of the $L_0$ transaction that it represents may nonetheless be undone if that transaction was itself aborted.

Specifically, if the part-122a-represented $L_0$ compensation transaction aborts, commit record 128 will not be present in the operation log 31. The $L_0$ undo pass of the recovery operation that occurs after the abort therefore will reach, say, update record 124 without having encountered a commit record for the transaction that record 124 identifies, so the undo procedure will perform the $L_0$ undo operation that record 124 identifies and add a corresponding $L_0$ CLR to the operation log 31, as it would for a normal forward $L_0$ operation; indeed, in this scheme, log record 124's operation is a normal forward $L_0$ operation. Thus, the $L_0$ undo pass does initially undo the constituent operations of the $L_0$ compensation transaction—i.e., of the $L_1$ undo operation—that record part 122a records.

But its response to its subsequent encounter with record part 122b reinstates that compensation transaction and thus justifies the fact that record part 122a remains in the (durable) operation log and will consequently occupy the $L_1$ level log. Specifically, unlike the record-type field contents of ordinary start record 54", to which the $L_0$ undo process responds by simply adding a (typically abort-type) commit record 96" to the operation log 31 to indicate that the roll-back of its transaction had completed, those of start record part 122b distinguish it as the start record of a compensation transaction, which cannot remain rolled back. The transaction-redo field 130 identifies the $L_1$ redo operation for the $L_1$ operation that the $L_1$ CLR part 122a represents, i.e., the $L_1$ undo operation for the $L_1$ operation that update record part 64a" represents. When the $L_0$ undo pass encounters record 122, it interrupts its $L_0$ compensation operations to perform the indicated $L_1$ redo operation. Record part 122a thus correctly indicates that the record-64a"-represented $L_1$ operation has been undone and should not be undone again.

The recovery procedure's treatment of the transaction identified in part 122b of double record 122 does not depend on whether the $L_1$ transaction 50" identified in the other part 122a is active; indeed, commit record 128's absence, which is what permits the recovery procedure to react to start record 122b, does not occur when that transaction is not active. But record 122 is still a two-part record, as opposed to two single records, in the sense that one part must always be written with the other: since a subsequent undo-recovery procedure that encounters CLR 122a will refrain from responding to an encounter with record 64a" by undoing the operation that record 64a" represents, the operation log on which such a second recovery procedure operates must be guaranteed to include record 122b, whose presence insures that the record-64a"-represented transaction is undone if its undo operation had not previously committed. Conversely, if a second recovery operation encounters start-compensation-transaction record 122b and has thus guaranteed that the record-64a"-represented transaction has been undone, it must also encounter CLR 122a to prevent that transaction from being undone a second time.

It will be apparent in light of the foregoing description that the principles of the present invention can be practiced in a wide range of embodiments. Clearly, although only two transaction levels were discussed explicitly, the illustrated embodiment is applicable to any number of further levels. Additionally, reflection reveals that the approaches exemplified by the discussions accompanying FIGS. 5, 9, and 11 are not mutually exclusive; in particular, the transaction designer can designate some operations to be undone by operations at their own levels and other operations in the same transaction structure to be undone by undoing lower-level operations. Moreover, the record formats described above are only examples; any format that records the requisite information is applicable.

A review of the foregoing description reveals that a database that implements the recovery system described above can be implemented with much fewer logging and update restrictions than are imposed by prior-art systems for multi-level recovery. The present invention thus constitutes a significant advance in the art.

I claim:

1. In a database system that include transaction means for performing transactions, including both forward and compensation transactions, on database resources at different levels of abstraction, some transactions, called subtransactions, being constituent operations of other, higher-level, parent transactions; logging means for maintaining a durable operation log into which, in response to loggable events in a transaction's performance, including the commitment of the transaction, the logging means enters log records that include a transaction ID identifying that transaction; and recovery means for recovering from an abort of a transaction by causing the transaction means to perform undo operations in accordance with the contents of log records that include that transaction's ID, the improvement wherein:
A) the log record entered into the durable operation log in response to a forward substransaction's commitment additionally includes that subtransaction's parent transaction's transaction ID and undo information identifying an undo-operation routine at the parent transaction's level for undoing that subtransaction; and
B) the recovery means recovers from an aborted parent transaction by causing the transaction means to perform a compensation transaction at the parent transaction's subtransaction's level by executing the undo-operation routine identified by the undo information in a log record entered in response to the commitment of a subtransaction of that parent transaction.

2. A database system as defined in claim 1 wherein:
A) the compensation transaction at the subtransaction's level comprises a plurality of constituent operations at that level; and
B) in response to performance of at least some of the compensation transaction's constituent operations, the logging means enters log records that omit the aborted parent transaction's transaction ID.

3. A database system as defined in claim 2 wherein:
A) the log records entered in response to at least some operations contain redo information identifying redo-operation routines for redoing those operations; and
B) in recovering from an aborted transaction, the recovery means:
i) first scans forward through the operation log and causes the transaction means to perform redo operations in accordance with redo information contained in log records encountered in the forward scan; and
ii) then, for each transaction level, performs a separate backward transaction-log scan associated therewith and causes the transaction means to perform undo operations in accordance with undo information in the log records entered in response to operations of aborted transactions at the associated level.

4. A database system as defined in claim 3 wherein the log record entered into the durable operation log in response to the commitment of a compensation transaction performed to undo an aborted parent transaction's committed subtransaction includes the transaction IDs both of the compensation transaction and of the parent transaction.

5. A database system as defined in claim 3 wherein the logging means enters log records in response to loggable events in the performance of transactions at all levels in a common durable operation log in which the log records are ordered in accordance with the occurrences of the events that they document.

6. A database system as defined in claim 2 wherein the log record entered into the durable operation log in response to the commitment of a compensation transaction performed to undo an aborted parent transaction's committed subtransaction includes the transaction IDs both of the compensation transaction and of the parent transaction.

7. A database system as defined in claim 6 wherein:
A) in response to undo operations, the logging means enters log records whose contents distinguish them as compensation log records; and
B) the recovery means refrains from undoing the undo operations that the compensation log records document.

8. A database system as defined in claim 1 wherein:
A) the log records entered in response to at least some operations contain redo information identifying redo-operation routines for redoing those operations; and
B) in recovering from an aborted transaction, the recovery means:
i) first scans forward through the operation log and causes the transaction means to perform redo operations in accordance with redo information contained in lo records encountered in the forward scan; and
ii) then, for each transaction level, performs a separate backward transaction-log scan associated therewith and causes the transaction means to perform undo operations in accordance with undo information in the log records entered in response to operations of aborted transactions at the associated level.

9. A database system as defined in claim 8 wherein the log record entered into the durable operation log in response to the commitment of a compensation transaction performed to undo an aborted parent transaction's committed subtransaction includes the transaction IDs both of the compensation transaction and of the parent transaction.

10. A database system as defined in claim 9 wherein:
A) in response to undo operations, the logging means enters log records whose contents distinguish them as compensation log records; and B) the recovery means refrains from undoing the undo operations that the compensation log records document.

11. A database system as defined in claim 8 wherein the logging means enters log records in response to loggable events in the performance of transactions at all levels in a common durable operation log in which the log records are ordered in accordance with the occurrences of the events that they document.

12. A database system as defined in claim 1 wherein the log record entered into the durable operation log in response to the commitment of a compensation transaction performed to undo an aborted parent transaction's committed subtransaction includes the transaction IDs both of the compensation transaction and of the parent transaction.

13. A database system as defined in claim 12 wherein:
A) in response to undo operations, the logging means enters log records whose contents distinguish them as compensation log records; and
B) the recovery means refrains from undoing the undo operations that the compensation log records document.

14. A database system as defined in claim 12 wherein:
A) among the loggable events to which the logging means responds by entering a log record is the updating of a database resource with the results of an operation;
B) each log record includes a record-type field that identifies that log record's type; and
C) the contents of the record-type field of a log record entered in response to updating a database resource with the results of a compensation transaction's constituent operation when that compensation transaction has not aborted are the same as those of the record-type field of a log record entered in response to updating a database resource with the results of a constituent operation of a transaction that is not a compensation transaction when that compensation transaction has not aborted.

15. A database system as defined in claim 14 wherein:
A) in response to undo operations, the logging means enters log records whose contents distinguish them as compensation log records; and
B) the recovery means refrains from undoing the undo operations that the compensation log records document.

16. A database system as defined in claim 1 wherein the logging means enters log records in response to loggable events in the performance of transactions at all levels in a common durable operation log in which the log records are ordered in accordance with the occurrences of the events that they document.

17. A database system as defined in claim 1 wherein:
A) among the loggable events to which the logging means responds by entering a log record is the updating of a database resource with the results of an operation;
B) each log record includes a record-type field that identifies the log record's type; and
C) the contents of the record-type field of a log record entered in response to updating a database resource with the results of a compensation transaction's constituent operation when that compensation transaction has not aborted are the same as those of the record-type field of a log record entered in response to updating a database resource with the results of a constituent operation of a transaction that is not a compensation transaction when that compensation transaction has not aborted.

18. A database system as defined in claim 1 wherein:
A) in response to undo operations, the logging means enters log records whose contents distinguish them as compensation log records; and
B) the recovery means refrains from undoing the undo operations that the compensation log records document.

19. A database system comprising:
A) transaction means for performing transactions, including compensation transactions, on database resources at different levels of abstraction, some transactions, called subtransactions, being constituent operations of other, higher-level, parent transactions;
B) logging means for maintaining a common durable operation log into which, in response to loggable events in a transaction's performance, including the commitment of the transaction and the updating of a database resource with the results of a constituent operation in that transaction, the logging means enters log records that include a transaction ID identifying that transaction, a record-type field identifying the record type, and, in response to at least some operations, redo information identifying redo-operation routines for redoing those operations, the common operation log receiving log records in response to loggable events in the performance of transactions at all levels, which records are ordered in accordance with the occurrences of the events that they document, the log record entered into the durable operation log in response to a forward subtransaction's commitment including that subtransaction's parent transaction's transaction ID and undo information identifying an undo-operation routine at the parent transaction's level for undoing that subtransaction, the log record entered into the durable log in response to the commitment of a compensation transaction performed to undo an aborted parent transaction's committed subtransaction including the transaction IDs both of the compensation transaction and of the parent transaction, the contents of the record-type field of a log record entered in response to updating a database resource with the results of a compensation transaction's constituent operation when that compensation transaction has not aborted being the same as those of the record-type field of a log record entered in response to updating a database resource with the results of a constituent operation of a transaction that is not a compensation transaction when that compensation transaction has not aborted, the record-type field in a log record entered into the durable operation log in response to an undo operation distinguishing it as a compensation log record, the log record entered into the durable operation log in response to performance of at least some of a compensation transaction's constituent operations omitting the aborted parent transaction's transaction ID; and
C) recovery means for recovering from an abort of a transaction by, first, scanning forward through the operation log and causing the transaction means to perform redo operations in accordance with redo information contained in log records encountered in the forward scan, and then, for each transaction level, performing a separate backward transaction-log scan associated with that level and causing the transaction means to perform undo operations in accordance with the contents of log records encountered in the scan that include the transaction IDs of aborted transactions at the associated level but to refrain from undoing the undo operations that the compensation log records document.

20. A method of operating a database system comprising the steps of:
A) performing transactions on database resources at different levels of abstraction, some transactions, called subtransactions, being constituent operations of other, higher-level, parent transactions;
B) maintaining a durable operation log by responding to a loggable event in a transaction's performance by entering into the operation log a log record that includes a transaction ID identifying that transaction and, when the loggable event is the commitment of a forward subtransaction, additionally includes that subtransaction's parent transaction's transaction ID and undo information identifying an undo-operation routine at the parent transaction's level for undoing that subtransaction; and
C) recovering from an aborted parent transaction by performing a compensation transaction at the parent transaction's subtransaction's level by executing the undo-operation routine identified by the undo information in a log record entered in response to the commitment of a subtransaction of that parent transaction.

21. A method as recited in claim 20 wherein:
A) the compensation transaction at the subtransaction's level comprises a plurality of constituent operations at that level; and
B) the step of maintaining a durable operation log includes entering, in response to performance of at least some of the compensation transaction's constituent operations, log records that omit the aborted parent transaction's transaction ID.

22. A method as recited in claim 21 wherein:
A) the log records entered in response to at least some operations contain redo information identifying redo-operation routines for redoing those operations; and
B) the recovery step comprises:
  i) first scanning forward through the operation log and performing redo operations in accordance with redo information contained in log records encountered in the forward scan; and
  ii) then, for each transaction level, performing a separate backward transaction-log scan associated therewith and performing undo operations in accordance with undo information in the log records entered in response to operations of aborted transactions at the associated level.

23. A method as defined in claim 22 wherein the log record entered into the durable operation log in response to the commitment of a compensation transaction performed to undo an aborted parent transaction's committed subtransaction includes the transaction IDs both of the compensation transaction and of the parent transaction.

24. A method as defined in claim 22 wherein the logging step comprises entering log records in response to loggable events in the performance of transactions at all levels in a common durable operation log in which the log records are ordered in accordance with the occurrences of the events that they document.

25. A method as defined in claim 21 wherein the log record entered into the durable operation log in response to the commitment of a compensation transaction performed to undo an aborted parent transaction's committed subtransaction includes the transaction IDs both of the compensation transaction and of the parent transaction.

26. A method as defined in claim 25 wherein:
A) the logging step comprises responding to undo operations by entering log records whose contents distinguish them as compensation log records; and
B) the recovery step comprises refraining from undoing the undo operations that the compensation log records document.

27. A method as recited in claim 20 wherein:
A) the log records entered in response to at least some operations contain redo information identifying redo-operation routines for redoing those operations; and
B) the recovery step comprises:
  i) first scanning forward through the operation log and performing redo operations in accordance with redo information contained in log records encountered in the forward scan; and
  ii) then, for each transaction level, performing a separate backward transaction-log scan associated therewith and performing undo operations in accordance with undo information in the log records entered in response to operations of aborted transactions at the associated level.

28. A method as defined in claim 27 wherein the log record entered into the durable operation log in response to the commitment of a compensation transaction performed to undo an aborted parent transaction's committed subtransaction includes the transaction IDs both of the compensation transaction and of the parent transaction.

29. A method as defined in claim 28 wherein:
A) the logging step comprises responding to undo operations by entering log records whose contents distinguish them as compensation log records; and
B) the recovery step comprises refraining from undoing the undo operations that the compensation log records document.

30. A method as defined in claim 27 wherein the logging step comprises entering log records in response to loggable events in the performance of transactions at all levels in a common durable operation log in which the log records are ordered in accordance with the occurrences of the events that they document.

31. A method as defined in claim 20 wherein the log record entered into the durable operation log in response to the commitment of a compensation transaction performed to undo an aborted parent transaction's committed subtransaction includes the transaction IDs both of the compensation transaction and of the parent transaction.

32. A method as defined in claim 31 wherein:
A) the logging step comprises responding to undo operations by entering log records whose contents distinguish them as compensation log records; and
B) the recovery step comprises refraining from undoing the undo operations that the compensation log records document.

33. A method as defined in claim 31 wherein:

A) the logging step includes entering a log record in response to the updating of a database resource with the results of an operation;
B) each log record includes a record-type field that identifies the log record's type; and
C) in response to the updating of a database resource with the results of a compensation transaction's constituent operation when that compensation transaction has not aborted, entering a log record whose record-type-field contents are the same as those of a log record entered in response to updating a database resource with the results of a constituent operation of a transaction that is not a compensation transaction when that compensation transaction has not aborted.

34. A method as defined in claim 33 wherein:
A) the logging step comprises responding to undo operations by entering log records whose contents distinguish them as compensation log records; and
B) the recovery step comprises refraining from undoing the undo operations that the compensation log records document.

35. A method as defined in claim 20 wherein the logging step comprises entering log records in response to loggable events in the performance of transactions at all levels in a common durable operation log in which the log records are ordered in accordance with the occurrences of the events that they document.

36. A method as defined in claim 20 wherein:
A) the logging step includes entering a log record in response to the updating of a database resource with the results of an operation;
B) each log record includes a record-type field;
C) the recovering step includes interpreting the remainder of a log record on the basis of its record-type field; and
D) in response to the updating of a database resource with the results of a compensation transaction's constituent operation when that compensation transaction has not aborted, entering a log record whose record-type-field contents are the same as those of a log record entered in response to updating a database resource with the results of a constituent operation of a transaction that is not a compensation transaction when that compensation transaction has not aborted.

37. A method as defined in claim 20 wherein:
A) the logging step comprises responding to undo operations by entering log records whose contents distinguish them as compensation log records; and
B) the recovery step comprises refraining from undoing the undo operations that the compensation log records document.

* * * * *